(12) United States Patent
Wu et al.

(10) Patent No.: US 12,489,708 B2
(45) Date of Patent: Dec. 2, 2025

(54) DATA TRANSMISSION CONTROL METHOD AND APPARATUS, COMPUTER-READABLE STORAGE MEDIUM, COMPUTER DEVICE, AND COMPUTER PROGRAM PRODUCT

(71) Applicant: TENCENT TECHNOLOGY (SHENZHEN) COMPANY LIMITED, Shenzhen (CN)

(72) Inventors: Bo Wu, Shenzhen (CN); Changkui Ouyang, Shenzhen (CN); Fuyu Wang, Shenzhen (CN); Cheng Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/589,799

(22) Filed: Feb. 28, 2024

(65) Prior Publication Data

US 2024/0223503 A1    Jul. 4, 2024

Related U.S. Application Data

(63) Continuation of application No. PCT/CN2023/096237, filed on May 25, 2023.

(30) Foreign Application Priority Data

Jul. 15, 2022 (CN) .......................... 202210835843.8

(51) Int. Cl.
*H04L 47/10* (2022.01)
*H04L 41/16* (2022.01)
*H04L 43/08* (2022.01)

(52) U.S. Cl.
CPC .............. *H04L 47/10* (2013.01); *H04L 41/16* (2013.01); *H04L 43/08* (2013.01)

(58) Field of Classification Search
CPC .......... G06N 20/00; G06N 3/08; G06N 3/045; G06N 7/01; H04L 41/16; H04L 41/145; H04L 45/08
See application file for complete search history.

(56) References Cited

U.S. PATENT DOCUMENTS 12,001,320 B2 * 6/2024 Liu ..................... G06F 11/3684
2008/0049747 A1   2/2008 Mcnaughton et al.
(Continued)

FOREIGN PATENT DOCUMENTS

CN     101431469 A     5/2009
CN     102740368 A     10/2012
(Continued)

OTHER PUBLICATIONS

The World Intellectual Property Organization (WIPO) International Search Report for PCT/CN2023/096237 Sep. 4, 2023 6 Pages (including translation).

(Continued)

*Primary Examiner* — Chirag R Patel
(74) *Attorney, Agent, or Firm* — Anova Law Group, PLLC

(57) ABSTRACT

A method includes obtaining historical network performance data of each of data transmission objects, calculating, based on the historical network performance data, group network performance data of each of object groups, performing weighted calculation on the group network performance data of the object groups to obtain comprehensive network performance data of the data transmission objects, inputting the comprehensive network performance data and the group network performance data into a trained RL model to obtain a data transmission quality index of each object group, for each object group, determining a data transmission parameter of the object group based on the data transmission quality index and the group network perfor- (Continued)

mance data of the object group, and determining, in response to receiving a data transmission request transmitted by a target data transmission object, a target data transmission parameter based on a target object group to which the target data transmission object belongs.

18 Claims, 8 Drawing Sheets

(56) References Cited

U.S. PATENT DOCUMENTS

| | | | | |
|---|---|---|---|---|
| 2022/0167188 A1* | 5/2022 | Soulhi | | G06N 10/60 |
| 2022/0247643 A1* | 8/2022 | Dechene | | H04L 45/64 |
| 2023/0060623 A1* | 3/2023 | Wang | | H04L 41/16 |

FOREIGN PATENT DOCUMENTS

| | | |
|---|---|---|
| CN | 103532868 A | 1/2014 |
| CN | 103702344 A | 4/2014 |
| CN | 111756646 A | 10/2020 |
| CN | 112770353 A | 5/2021 |
| CN | 115208518 A | 10/2022 |
| EP | 3780542 A1 | 2/2021 |

OTHER PUBLICATIONS

The European Patent Office (EPO) The Extended European Search Report for Application No. 23838559.5 Feb. 7, 2025 10 Pages.

* cited by examiner

DATA TRANSMISSION CONTROL METHOD AND APPARATUS, COMPUTER-READABLE STORAGE MEDIUM, COMPUTER DEVICE, AND COMPUTER PROGRAM PRODUCT

CROSS-REFERENCE TO RELATED APPLICATIONS

This application is a continuation of International Application No. PCT/CN2023/096237, filed on May 25, 2023, which claims priority to Chinese Patent Application No. 202210835843.8, filed on Jul. 15, 2022, the entire contents of both of which are incorporated herein by reference.

FIELD OF THE TECHNOLOGY

This application relates to the field of communications technologies, and relates to, but is not limited to, a data transmission control method and apparatus, a computer-readable storage medium, a computer device, and a computer program product.

BACKGROUND OF THE DISCLOSURE

In recent years, with the continuous rise of various short video services, audio and video traffic has shown explosive growth. A contradiction between ever-increasing user experience demands of a client and lagging network transmission performance has become a main contradiction that needs to be resolved urgently. Based on the above, a person skilled in the art proposes a series of congestion control technologies, for example, a cubic binary increase congestion control (CUBIC) algorithm based on packet loss information, and a network congestion control algorithm based on bandwidth detection (BBR, Bottleneck Bandwidth and RTT). The foregoing congestion control algorithms may improve quality of network transmission to some extent.

However, the congestion control algorithms in the related art are all control algorithms that are set based on expert experience and conform to fixed rules, which are difficult to adapt to changing network status and network services. Therefore, in the face of some new scenarios, the current congestion control algorithms cannot adapt to these new scenarios, which leads to degraded data transmission performance of a network and unstable network performance.

SUMMARY

In accordance with the disclosure, there is provided a data transmission control method including obtaining historical network performance data of each of a plurality of data transmission objects, calculating, based on the historical network performance data, group network performance data of each of a plurality of object groups each including one or more data transmission objects of the plurality of data transmission objects, performing weighted calculation on the group network performance data of the object groups to obtain comprehensive network performance data of the plurality of data transmission objects, inputting the comprehensive network performance data and the group network performance data of each object group into a trained reinforcement learning (RL) model to obtain a data transmission quality index of each object group, for each object group of the plurality of object groups, determining a data transmission parameter of the object group based on the data transmission quality index and the group network performance data of the object group, determining, in response to receiving a data transmission request transmitted by a target data transmission object among the plurality of data transmission objects, a target data transmission parameter based on a target object group to which the target data transmission object belongs, and controlling a data transmission process corresponding to the data transmission request based on the target data transmission parameter.

Also in accordance with the disclosure, there is provided a computer device including one or more processors and one or more memories storing one or more instructions that, when executed by the one or more processors, cause the one or more processors to obtain historical network performance data of each of a plurality of data transmission objects, calculate, based on the historical network performance data, group network performance data of each of a plurality of object groups each including one or more data transmission objects of the plurality of data transmission objects, perform weighted calculation on the group network performance data of the object groups to obtain comprehensive network performance data of the plurality of data transmission objects, input the comprehensive network performance data and the group network performance data of each object group into a trained reinforcement learning (RL) model to obtain a data transmission quality index of each object group, for each object group of the plurality of object groups, determine a data transmission parameter of the object group based on the data transmission quality index and the group network performance data of the object group, determine, in response to receiving a data transmission request transmitted by a target data transmission object among the plurality of data transmission objects, a target data transmission parameter based on a target object group to which the target data transmission object belongs, and control a data transmission process corresponding to the data transmission request based on the target data transmission parameter.

Also in accordance with the disclosure, there is provided a non-transitory computer-readable storage medium storing one or more instructions that, when executed by one or more processors, cause the one or more processors to obtain historical network performance data of each of a plurality of data transmission objects, calculate, based on the historical network performance data, group network performance data of each of a plurality of object groups each including one or more data transmission objects of the plurality of data transmission objects, perform weighted calculation on the group network performance data of the object groups to obtain comprehensive network performance data of the plurality of data transmission objects, input the comprehensive network performance data and the group network performance data of each object group into a trained reinforcement learning (RL) model to obtain a data transmission quality index of each object group, for each object group of the plurality of object groups, determine a data transmission parameter of the object group based on the data transmission quality index and the group network performance data of the object group, determine, in response to receiving a data transmission request transmitted by a target data transmission object among the plurality of data transmission objects, a target data transmission parameter based on a target object group to which the target data transmission object belongs, and control a data transmission process corresponding to the data transmission request based on the target data transmission parameter.

BRIEF DESCRIPTION OF THE DRAWINGS

To describe technical solutions of embodiments of this application more clearly, accompanying drawings required for describing the embodiments are briefly described below. Apparently, the accompanying drawings in the following description merely show some embodiments of this application, and a person skilled in the art may still derive other accompanying drawings from these accompanying drawings without creative efforts.

DESCRIPTION OF EMBODIMENTS

Technical solutions in embodiments of this application are clearly and completely described below with reference to accompanying drawings in the embodiments of this application. Apparently, the described embodiments are merely some of the embodiments of this application, but not all of the embodiments. All other embodiments obtained by a person skilled in the art based on the embodiments of this application without creative efforts fall within the protection scope of this application.

Embodiments of this application provide a data transmission control method and apparatus, a computer-readable storage medium, a computer device, and a computer program product. The data transmission control method may be used in the data transmission control apparatus. The data transmission control apparatus may be integrated in the computer device, and the computer device may be a terminal or a server. The terminal may be a device such as a mobile phone, a tablet computer, a notebook computer, a smart television, a wearable smart device, a personal computer (PC), and an onboard terminal. The server may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name service, a security service, a network acceleration service (such as through CDN, content delivery network), and a big data and artificial intelligence platform. The server may be a node in a blockchain.

Figure 1:
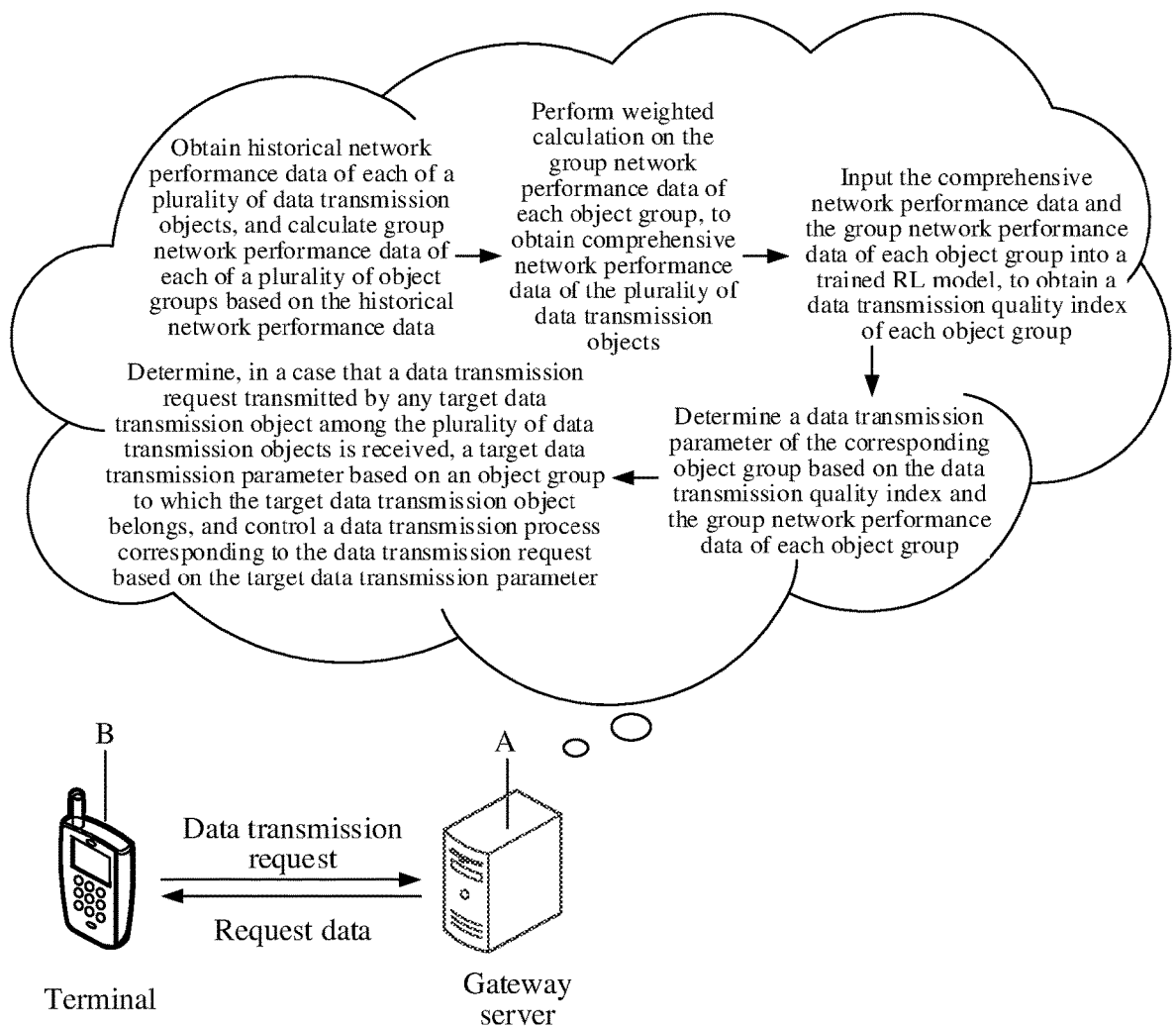
FIG. 1 is a schematic diagram showing a scenario for a data transmission control method according to an embodiment of this application.

FIG. 1 is a schematic showing a scenario for a data transmission control method according to an embodiment of this application. As shown in FIG. 1, a data transmission control system includes at least a gateway server A and a terminal B. The terminal B may request the gateway server A to transmit specific data. To be specific, the terminal B may transmit a data transmission request to the gateway server A to request the gateway server A to transmit to-be-transmitted data, and the gateway server A may obtain request data in response to the data transmission request of the terminal B, and return the request data to the terminal B. Before the gateway server A receives the data transmission request of the terminal B, the gateway server A may obtain historical network performance data of each of a plurality of data transmission objects, and calculate group network performance data of each object group based on the historical network performance data, the object group being a group obtained by dividing the plurality of data transmission objects. Weighted calculation is performed on the group network performance data of each object group, to obtain comprehensive network performance data corresponding to the plurality of data transmission objects. Then a trained reinforcement learning (RL) model is invoked for prediction based on the comprehensive network performance data and the group network performance data of each object group, to obtain a data transmission quality index of each object group. Next, a data transmission parameter of each object group is calculated based on the data transmission quality index and the group network performance data of each object group. In some embodiments, the data transmission control system may further include a data storage unit. After the data transmission parameter of each object group is calculated, the data transmission parameter of each object group may be stored in the data storage unit. In this way, when the gateway server A receives the data transmission request transmitted by the terminal B, a target data transmission parameter corresponding to the object group may be determined based on the object group to which the terminal B belongs. Then a data transmission process of the terminal B is controlled based on the target data transmission parameter. In other words, the terminal B is used as a data transmission object, and the object group to which the terminal B belongs may be determined based on a terminal identifier of the terminal B. Then the data transmission parameter of the object group is obtained from the data storage unit, and the obtained data transmission parameter is determined as a target data transmission parameter of the terminal B. Afterward, the data transmission process of the terminal B may be controlled based on the target data transmission parameter, to return the request data to the terminal B.

For example, a short video application may be installed on the terminal B. A user performs a refresh operation through a client of the short video application. The client of the short video application generates a video recommendation request in response to the refresh operation performed by the user, and transmits the video recommendation request to the gateway server A as the data transmission request in this embodiment of this application. The gateway server A may adopt the data transmission control method provided in this embodiment of this application to calculate the data transmission parameter of each object group before responding to the video recommendation request transmitted by the terminal B through the client of the short video application. The object group herein may be different short video accounts in the short video application. When the gateway server A responds to the video recommendation request transmitted by the terminal B through the client of the short video application, the gateway server A may parse the video recommendation request to obtain the short video account of the user in the short video application. A mapping relationship exists between the short video account and the terminal B. Therefore, the object group to which the terminal B belongs may be determined based on the short video account. The target data transmission parameter corresponding to the object group may be determined based on the object group to which the terminal B belongs. Then the short video data transmission process of the video recommendation request transmitted by the terminal B through the client of the short video application is controlled based on the target data transmission parameter.

The schematic diagram shown in FIG. 1 is merely an example. The data transmission control scenario described in this embodiment of this application is intended to describe the technical solutions of the embodiments of this application more clearly, and does not constitute a limitation on the technical solutions provided in the embodiments of this application. A person of ordinary skill in the art may learn that with the evolution of data transmission control scenarios and the emergence of new service scenarios, the technical solutions provided in the embodiments of this application are also applicable to similar technical problems.

Based on the above implementation scenario, a detailed description is given below.

In a scenario of network data transmission, when a relatively large amount of audio and video data needs to be transmitted, a problem of data transmission congestion may occur. To resolve the problem of data transmission congestion and improve data transmission efficiency and data transmission quality, a person skilled in the art proposes a plurality of congestion control algorithms to improve network transmission quality. In this regard, with the increasing maturity of the artificial intelligence technology in recent years, machine learning-based adaptive congestion control may automatically adapt to changes in network states and achieve benefits in network transmission performance in a manner such as parameter setting. These methods may improve the network data transmission quality by setting relevant parameters of congestion control through RL. However, these methods are hardly feasible because a parameter set is set through human experience and these methods are completely divorced from an existing congestion control mechanism. In addition, these methods have a problem of lack of stability, and therefore cannot be deployed and used in the existing network. In view of this, an embodiment of this application provides a data transmission control method, to alleviate the congestion problem during the data transmission to some extent and improve the data transmission performance.

Figure 2:
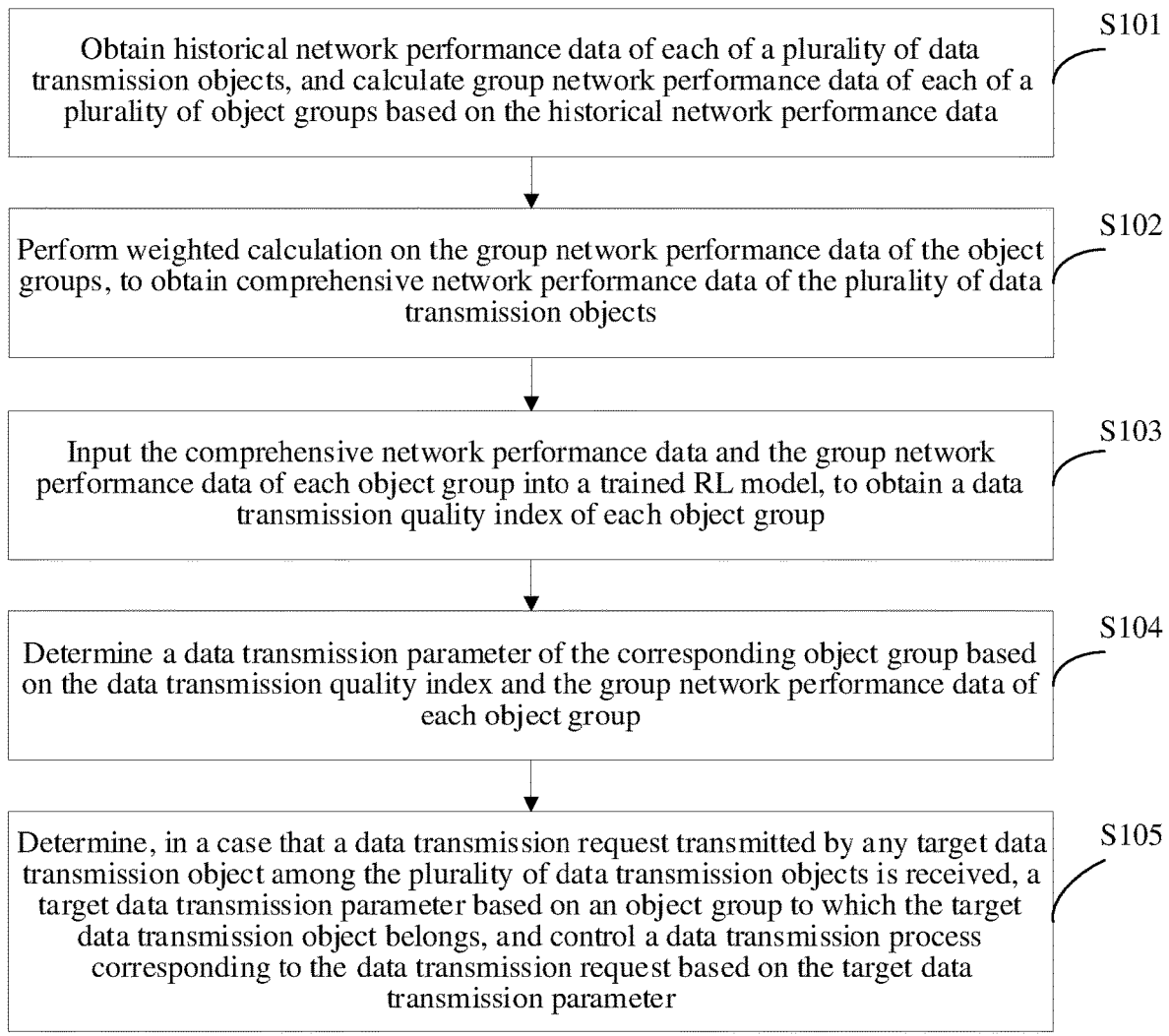
FIG. 2 is a schematic flowchart of a data transmission control method according to an embodiment of this application.

This embodiment of this application is to be described from the perspective of the data transmission control apparatus. The data transmission control apparatus may be integrated in a computer device. The computer device may be a terminal or a server. FIG. 2 is a schematic flowchart of a data transmission control method according to an embodiment of this application. This embodiment of this application is described by using an example in which the data transmission control method is performed by a server in a computer device. The method includes the following processes S101 to S105:

Process S101: Obtain historical network performance data of each of a plurality of data transmission objects, and calculate group network performance data of each of a plurality of object groups based on the historical network performance data.

In this embodiment of this application, the plurality of data transmission objects may be all registered users of an application. For example, an instant messaging application or a short video application has an application server that provides data services, and a plurality of application clients registered with the application. Since each application client may be an object for data transmission by the application server of the application, it may be determined herein that all application clients registered with the application are the plurality of data transmission objects. Alternatively, in some cases, some clients registered with the application may be set as the plurality of data transmission objects. For example, in the foregoing short video application, among the application clients of the short video application, only some clients of registered users are member user clients. Then data transmission control may only be performed on these member user clients to optimize data transmission performance of these member user clients during data transmission, so as to provide good data transmission service and smooth viewing experience for these member user clients. Alternatively, in some cases, some users have lower demands for data transmission while other users have higher demands for data transmission. Then targeted optimization may be performed on the users with higher demands for data transmission, and the users with higher demands for data transmission are determined as the plurality of data transmission objects. Herein, a data transmission demand parameter of a user may be determined based on a frequency of data transmission of the user and an amount of data requested for transmission. When the data transmission demand parameter of any user is greater than a demand parameter threshold, it indicates that the user has a higher demand for data transmission. When the data transmission demand parameter of any user is less than or equal to the demand parameter threshold, it indicates that the user has a lower demand for data transmission. In other words, in this embodiment of this application, the plurality of data transmission objects may be personalized, which is not limited herein.

The historical network performance data of the data transmission object may be data obtained by collecting statistics about the network performance data of the data transmission object within a period of time prior to a current moment. For example, statistics about the network performance data of the data transmission object may be periodically collected. For example, statistics about the network performance data within a time length between a last statistics collection moment and a current statistics collection moment are collected every T time interval. When the data transmission needs to be controlled, the statistical network performance data of the data transmission object collected most recently may be used as the historical network performance data of the data transmission object.

In some embodiments, the network performance data of the data transmission object is a parameter for reflecting network transmission performance of the data transmission object during data transmission. The network performance data of the data transmission object can represent network quality of service (QOS) information of the data transmission object during data transmission. The historical network performance data of the data transmission object refers to network performance data within a historical time period, which is a parameter used for reflecting network transmission performance of the data transmission object during data transmission within the historical time period.

For example, the network performance data may be the QoS information such as a minimum round-trip time (RTT) (which may be expressed as min_rtt), a maximum RTT (which may be expressed as max_rtt), a smooth RTT (which may be expressed as srtt), a maximum quantity of inflight packets (which may be expressed as max_inflight), an effective throughput (which may be expressed as goodput), a retransmission ratio (which may be expressed as retran_ratio), an initial window (which may be expressed as init_cwnd), and a maximum window (which may be expressed as max_cwnd) of the data transmission object during data transmission.

In some embodiments, the obtaining the historical network performance data of the plurality of data transmission objects and calculating group network performance data of each object group based on the historical network performance data may be implemented in the following manners: first obtaining Internet protocol (IP) address data of each of the plurality of data transmission objects, and obtaining the historical network performance data of each data transmission object; then dividing the plurality of data transmission objects into the plurality of object groups based on the IP address data of each data transmission object; and finally calculating the group network performance data of the object group based on the historical network performance data of the data transmission object in each object group.

In this embodiment of this application, the object group is a group obtained by grouping the plurality of data transmission objects. The plurality of data transmission objects may be divided into a plurality of groups in any grouping manner, and each group may be referred to as an object group. In this way, the historical network performance data corresponding to the object group may be calculated based on the historical network performance data of the data transmission object in each object group. To be specific, the group network performance data of each object group may be calculated.

In this embodiment of this application, the plurality of data transmission objects are divided into groups, which may be divided based on the IP address data of each data transmission object. For example, the IP address data may be an IP address of the data transmission object. As described above, the data transmission object may be a client of an application, and then the IP address of the data transmission object may be an IP address of a terminal loading the client. The terminal may be a terminal that may connect to the Internet and transmit data, such as a smartphone, a tablet, a smartwatch, or a personal computer.

For example, the IP addresses of the plurality of data transmission objects and the historical network performance data of each data transmission object may be first obtained. Then the plurality of data transmission objects may be divided into a plurality of object groups based on the IP address of each data transmission object. For example, the data transmission objects corresponding to the IP addresses within a preset address interval may be divided into an object group. To be specific, the IP addresses of the data transmission objects are divided based on the preset address interval, and the data transmission objects corresponding to the IP addresses within the same preset address interval are divided into an object group. Next, the group network performance data of each object group is calculated based on the historical network performance data of the data transmission object included in each object group. The dividing based on the IP addresses of the data transmission objects may be dividing according to rules such as regions, operators, autonomous system (AS) numbers, and access patterns of the IP addresses. During the dividing based on the IP address data of the data transmission object, the dividing may be dividing according to all the rules or some rules. For example, during the dividing according to all the rules, the dividing may be dividing based on region+operator+AS number+access pattern. During the dividing according to some rules, the dividing may be dividing according to the rules such as region+operator, region+access pattern, or regions. It may be understood that the data transmission process of data transmission objects in the same object group has similar network forwarding paths, and also has similar network state information. To be specific, when the data transmission objects in the same object group perform data transmission control, the same data transmission parameter may be used for control.

In some embodiments, that the group network performance data of each object group is calculated based on the historical network performance data of the data transmission object in each object group may be implemented in the following manners: first determining a historical network performance data set corresponding to the corresponding object group based on the historical network performance data of each data transmission object in each object group; and then calculating an average of the historical network performance data in each historical network performance data set, and determining the average corresponding to each historical network performance data set as the group network performance data of the corresponding object group.

In this embodiment of this application, for the calculation of the group network performance data corresponding to each object group, the historical network performance data of the data transmission objects included in each object group may be averaged, to obtain the average of the historical network performance data. The average of the historical network performance data is determined as the group network performance data corresponding to the corresponding object group. For example, the data transmission object included in each object group may be determined first, and then the historical network performance data of each data transmission object in the object group may be determined, to obtain the historical network performance data set corresponding to each object group. Next, the average of the historical network performance data in each historical network performance data set may be calculated. In other words, all the historical network performance data in the historical network performance data set is summed, and then a result of the summation is divided by a quantity of the historical network performance data in the historical network performance data set, to obtain the average of the historical network performance data in the historical network performance data set, thereby obtaining the group network performance data corresponding to each object group.

In some embodiments, before the average of the historical network performance data of the plurality of data transmission objects in each object group is calculated to calculate the group network performance data of the object group, anomaly detection may also be performed on the historical network performance data of each data transmission object to determine whether abnormal data exists in the historical network performance data of the data transmission object in the object group, thereby avoiding existence of the abnormal data in the historical network performance data of the data transmission object in the object group, so as to ensure accuracy of the calculation of the group network performance data. The anomaly detection may be performed on the historical network performance data of each data transmission object based on the historical network performance data in a time dimension of a preset length. The preset length is greater than a time length corresponding to the historical network performance data. For example, the historical network performance data of the data transmission object is QoS data within 1 hour before a current time, and then QoS data within 1 month before the current time of the data transmission object may be used to detect the QoS data of the data transmission object within 1 hour, to determine whether any apparent abnormality occurs in the QoS data. During implementation, the QoS data of the data transmission object within 1 hour before the current time may be predicted based on the QoS data of the data transmission object within 1 month before the current time, to obtain predicted QoS data. Then a difference between the predicted QoS data and measured QoS data is calculated. If the difference is greater than a preset ratio, it is determined that the historical network performance data of the data transmission object is abnormal.

If it is determined that the QoS data of the data transmission object is abnormal, the historical network performance data of the data transmission object may be removed during the calculation of the group network performance data.

Process S102: Perform weighted calculation on the group network performance data of the object groups, to obtain comprehensive network performance data of the plurality of data transmission objects.

Herein, after the group network performance data of each object group is calculated, weighted calculation may be further performed on the group network performance data of all object groups, to obtain overall network performance data of all data transmission objects, which may be referred to as the comprehensive network performance data herein.

In some embodiments, the performing weighted calculation on the group network performance data to obtain the comprehensive network performance data may be implemented in the following manners: first obtaining a weight coefficient of each object group; and then performing weighted calculation on the group network performance data of the object groups based on the weight coefficients, to obtain the comprehensive network performance data corresponding to the plurality of data transmission objects.

In this embodiment of this application, in the calculation of the comprehensive network performance data based on the group network performance data of the object groups, the weight coefficient corresponding to each object group may be obtained first, and the weighted calculation is performed on the group network performance data of the object groups based on the weight coefficients of the object groups, to obtain the comprehensive network performance data.

In some embodiments, the weight coefficient of each object group may be obtained in the following manners: first obtaining a quantity of data transmission objects included in each object group; and then calculating a ratio of the quantity of data transmission objects in each object group to a quantity of the plurality of data transmission objects to obtain the weight coefficient of each object group, that is, determining a ratio of the quantity of data transmission objects in each object group to the quantity of the plurality of data transmission objects as the weight coefficient of the corresponding object group.

In this embodiment of this application, the weight coefficient of each object group may be calculated based on the quantity of data transmission objects included in the corresponding object group. For example, the quantity of data transmission objects included in each object group may be obtained first, and then the ratio of the quantity of data transmission objects in each object group to the quantity of the plurality of data transmission objects described above is calculated. To be specific, a ratio of a quantity of members in each group to a total quantity of members is calculated, and then the weight coefficient of each object group is obtained.

Process S103: Input the comprehensive network performance data and the group network performance data of each object group into a trained RL model, to obtain a data transmission quality index of each object group.

Herein, the RL model is one of models in the field of machine learning. The RL model is a data processing model implemented based on RL. Inspired by behavioral psychology, RL mainly focuses on how an agent takes different actions in an environment to maximize cumulative rewards. RL is mainly composed of the agent, the environment, a state, an action, and a reward. After the agent performs an action, the environment may transition to a new state, and the environment may give a reward signal (positive reward or negative reward) for the new state. Then the agent performs a new action according to a strategy based on the new state and the reward fed back by the environment. The above process is a manner of interaction between the agent and the environment through the state, the action, and the reward. RL allows the agent to learn of a state it is in and an action it should take to obtain a maximum reward. Since a manner in which the agent interacts with the environment is similar to a manner in which the human interacts with the environment, RL may be considered as a general learning framework, which may be used to resolve a problem of general artificial intelligence. Therefore, RL is also referred to as a machine learning method of general artificial intelligence.

In this embodiment of this application, setting of the network performance data during data transmission may be controlled based on the foregoing characteristics of the RL model. For example, a corresponding reward and environmental state may be set based on the comprehensive network performance data and group network performance data of each object group, so that a preset RL model learns a data transmission quality index corresponding to each object group. The data transmission quality index may be used for controlling the data transmission parameter of the corresponding object group to obtain a better reward value. In other words, the data transmission quality index is data outputted by the RL model to control the data transmission parameter of the corresponding object group.

In some embodiments, the trained RL model is invoked for prediction based on the comprehensive network performance data and the group network performance data of each object group, to obtain a data transmission quality index of each object group. To be specific, RL may be performed on the comprehensive network performance data and the group network performance data of each object group based on the RL model, so as to obtain the data transmission quality index of each object group. In some embodiments, the data transmission quality index of each object group may be obtained in the following manners: first calculating an RL parameter of each object group based on the group network performance data of each object group; and then using the comprehensive network performance data as the state value of the RL model and the RL parameter as the reward value of the RL model, and inputting the state value and the reward value into the RL model, to obtain an outputted data transmission quality index of each object group.

In some embodiments, the trained RL model may be any RL model. For example, the trained RL model may be a deep RL (DRL) model, a DRL model based on search and supervision, a DRL model based on a value function, and a DRL model based on a policy gradient.

In this embodiment of this application, the RL parameter of each object group may be first calculated based on the group network performance data of each object group, the RL parameter is used as the reward value of the RL model, then the foregoing calculated comprehensive network performance data is used as the state value of the RL model, the reward value and the state value are inputted into the RL model, and RL processing is performed on the RL model based on the reward value and the state value described above, to obtain output parameters learned by the RL model. In other words, the data transmission quality index of each object group is outputted through the RL model.

It may be understood that the calculated RL parameters are different for different object groups. To be specific, different reward values of the RL model lead to different learned output parameters. To be specific, for different object groups, the RL model may learn different output parameters. The output parameter may control the data transmission parameter of the corresponding object group, to continuously improve the RL parameters of the object groups. Therefore, the output parameter may also be referred to as the data transmission quality index.

In some embodiments, the calculating the RL parameter of each object group based on the group network performance data of each object group may be implemented in the following manners: first extracting goodput data and smooth RTT data from the group network performance data of each object group; and then calculating a ratio of the corresponding goodput data to the corresponding smooth RTT data of each object group, and determining the ratio as the RL parameter of each object group.

In this embodiment of this application, the RL parameter of each object group may be calculated by using the goodput data and the smooth RTT data in the group network performance data of each object group. The goodput data and the smooth RTT data may be first extracted from the group network performance data of each object group, then the ratio of the goodput data to the RTT data is calculated, and the ratio is used as the RL parameter of the corresponding object group. In this embodiment of this application, the ratio of the goodput data to the smooth RTT data is set as the RL parameter of the object group, which may mean that the ratio is used as the reward value of the RL model. A main consideration herein is that a learning goal of the RL model is to obtain a larger reward value, that is, to obtain a larger goodput and a shorter smooth RTT time, that is, to obtain higher QoS. Therefore, the ratio of the goodput data to the smooth RTT data is used as the reward value of the RL model.

Herein, the throughput refers to a quantity of bits received per second excluding control data (when no frame exists, a device reduces a maximum rate). Goodput refers to a number of bits transmitted to a correct destination interface per unit time. In computer networks (including wireless networks), goodput is an application-level throughput, i.e. a number of useful information bits delivered by a network of a source address to a certain destination per unit of time. The amount of data considered excludes protocol overhead bits as well as retransmitted data packets. For example, if a file is transferred, the goodput that a user experiences corresponds to a file size in bits divided by a file transfer time. The goodput is always lower than throughput (a gross bit rate that is transferred physically), which generally is lower than a network access connection speed (a channel capacity or bandwidth). The goodput data refers to an amount of data transmitted by a network, the goodput data may measure performance of the network, and the goodput data refers to an effective amount of data transmitted by the network.

The smooth RTT data refers to a weighted average RTT. Herein, the RTT refers to a difference between a time a packet segment is sent and a time a corresponding confirmation is received. The RTT may be calculated based on a timestamp value and a timestamp echo reply field included in a timestamp option in a TCP packet header. The weighted average RTT, also referred to as a smooth RTT, is an RTT obtained by performing weighted averaging on the RTT.

In some embodiments, the RL model is adopted to learn the data transmission quality index of each object group. The RL model may be adopted to perform RL a plurality of times based on the comprehensive network performance data and the group network performance data of each object group, to obtain a plurality of data transmission quality indexes of each object group. Then the average of the plurality of data transmission quality indexes is further calculated, and a more accurate data transmission quality index of each object group is finally obtained. In this embodiment of this application, an average of output parameters obtained through RL the plurality of times is used as a final output parameter, which may avoid a problem that the learned data transmission quality index is inaccurate due to a learning error, so that accuracy of the learned data transmission quality index may be improved.

Process S104: Determine a data transmission parameter of the corresponding object group based on the data transmission quality index and the group network performance data of each object group.

After the data transmission quality index of each object group is learned by using the RL model, the group network performance data of each object group may be further adjusted based on the data transmission quality index of each object group, so as to obtain the data transmission parameter of each object group. The data transmission process of the corresponding object group is controlled by using the data transmission parameter of each object group, so that a better data transmission effect may be obtained. To be specific, data transmission performance may be improved.

In this embodiment of this application, the data transmission parameter is a control parameter for controlling the data transmission process. During data transmission, a network bandwidth of the corresponding data transmission object may be controlled based on the data transmission parameter of the data transmission object, thereby avoiding network congestion and ensure transmission performance of the entire network.

In some embodiments, that the data transmission parameter of each object group is calculated based on the data transmission quality index and the group network performance data may be implemented in the following manners: first extracting goodput data and minimum RTT data of each object group from the group network performance data; and then calculating initial window data of the corresponding object group based on the goodput data, the minimum RTT data, and the data transmission quality index of each object group, and determining the data transmission parameter of the corresponding object group based on the initial window data of each object group.

In this embodiment of this application, the adjusting the group network performance data of the corresponding object group based on the learned data transmission quality index of each object group may be first extracting the goodput data and the minimum RTT data from the group network performance data of each object group, then calculating the initial window data of each object group based on the goodput data, the minimum RTT data, and the learned data transmission quality index, and then determining the initial window data of each object group as the data transmission parameter of the corresponding object group. In some embodiments, the data transmission parameter of each object group and the corresponding object group may also be stored in association with each other. In this way, when the data transmission parameter needs to be used for data transmission control, the stored data may be queried for the data transmission parameter of the object group, thereby improving efficiency of data transmission.

Process S105: Determine, in a case that a data transmission request transmitted by any target data transmission object among the plurality of data transmission objects is received, a target data transmission parameter based on an object group to which the target data transmission object belongs, and control a data transmission process corresponding to the data transmission request based on the target data transmission parameter. The object group to which the target data transmission object belongs is also referred to as a "target object group."

After the data transmission parameter corresponding to each object group is determined, the data transmission process of the corresponding data transmission object may be controlled based on the data transmission parameter corresponding to each object group before statistics about the historical network performance data in a next period are collected.

During the implementation, when the data transmission request transmitted by the target data transmission object is received, the object group corresponding to the target data transmission object may be determined first, then the target data transmission parameter of the object group is obtained, and the data transmission process of the target data transmission object is controlled based on the target data transmission parameter. For example, when a data transmission request transmitted from a client of an application to an application server is received, a target object group to which the client belongs may be determined, initial window data of the target object group is determined, and then the initial window data is adopted to control the data transmission process of the client.

It may be learned from the foregoing description that according to the data transmission control method provided in the embodiments of this application, the historical network performance data of each of a plurality of data transmission objects is obtained, and the group network performance data of each object group is calculated based on the historical network performance data, the object group being a group obtained by dividing the plurality of data transmission objects. Then weighted calculation is performed on the group network performance data to obtain comprehensive network performance data. A trained RL model is invoked for prediction based on the comprehensive network performance data and the group network performance data of each object group, to obtain a data transmission quality index of each object group. Next, a data transmission parameter of each object group is calculated based on the data transmission quality index and the group network performance data. In this way, in a case that the data transmission request transmitted by the target data transmission object is received, a target data transmission parameter may be determined based on an object group to which the target data transmission object belongs, and a data transmission process is controlled based on the target data transmission parameter. Therefore, according to the data transmission control method provided in the embodiments of this application, the data transmission objects are divided into groups, and then RL is performed on the historical network performance data of each object group in a recent period, to obtain the most suitable network data transmission parameter for each object group at a current time. According to the method, fine-grained control may be performed on the network data transmission parameter, so as to match the most suitable network data transmission parameter for each data transmission object at the current time, which may greatly improve the data transmission performance of the data transmission object. In addition, the data transmission control method provided in the embodiments of this application may enable data transmission control at a finer granularity and a higher accuracy, as well as a more targeted setting for session parameters upon establishment of a connection. The method of setting a data transmission control parameter value for each object group that conform to a network feature of the object group is conducive to improving the overall transmission quality of the network system. In other words, through the process of dividing the plurality of data transmission objects into groups and performing RL on the group network performance data of each object group, more accurate control of the data transmission parameter may be implemented, and the most suitable data transmission parameter may be matched for each data transmission object, so that the currently determined data transmission parameter is more suitable for a current network data transmission scenario, thereby improving scenario adaptability of the data transmission control method and data transmission performance of the network, and further improving the stability of the network performance.

In this embodiment of this application, content of user information is involved, for example, historical network performance data of each user (that is, historical network performance data of each data transmission object), a user group (UG) to which each user belongs (that is, an object group), and information such as a data transmission parameter of each object group. If data related to user information or enterprise information is involved, when the embodiments of this application are applied to specific products or technologies, user permission or consent needs to be obtained. In addition, relevant data collection and processing are to be strictly in accordance with the requirements of relevant national laws and regulations in an example application, informed consent or individual consent of a personal information subject needs to be obtained, and subsequent data use and processing are carried out within the scope of authorization of laws and regulations and the personal information subject.

In some embodiments, the foregoing data transmission control method may be an adaptive congestion control technology for dividing into UGs in a network communication system, which belongs to the field of network traffic transmission performance optimization. In this embodiment of this application, a server first divides IP addresses of a client into different object groups based on information such as regions and operators, and collects statistics about network performance data of a network flow of each object group in a previous time period at intervals. The server outputs a network transmission parameter value (such as an initial transmission window and an initial transmission rate) applicable to each object group in this period through expert experience or artificial intelligence based on the collected network performance data in the previous period. When a new connection request from the client reaches the server, the server queries for an object group identifier and a network transmission parameter corresponding to the client based on the IP address of the client. The server responds to the client request based on the network transmission parameter, and transmits corresponding network data. The adaptive congestion control technology involved in the embodiments of this application has advantages such as strong stability, fine control, a high degree of adaptation, and a light weight, which can help improve the transmission performance of the entire network system while ensuring feasibility.

The embodiments of this application are intended to resolve the problem that current network traffic cannot achieve adaptive congestion control, and to give consideration to the advantages such as the stability and fine control. The UG-oriented adaptive congestion control technology (that is, the foregoing object group) proposed in the embodiments of this application effectively resolves the stability problem encountered during execution of machine learning by combining historical information of network measurement with RL. Through division of UGs and UG-oriented network measurement, a specific initialized network parameter is set for each UG, to implement fine control of an initial stage of network traffic transmission.

Figure 3:
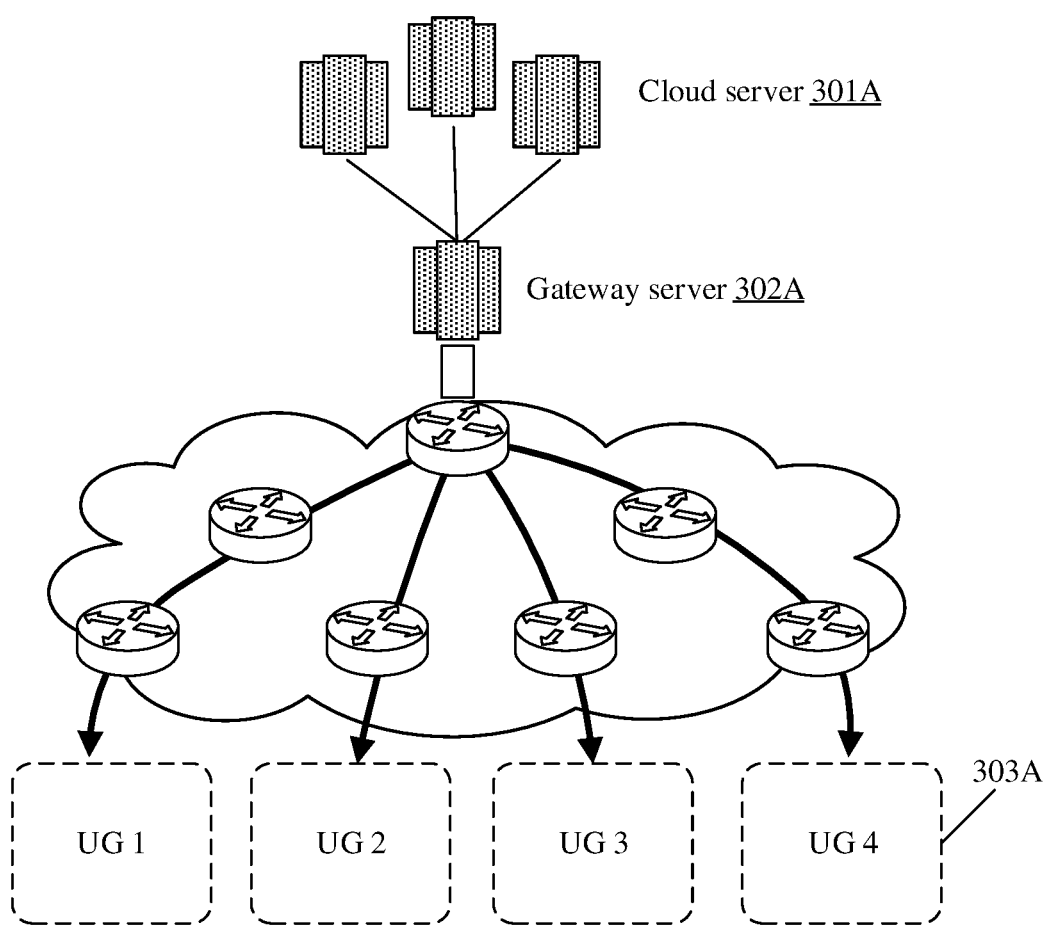
FIG. 3 is a schematic diagram showing a product side according to an embodiment of this application.

FIG. 3 is a schematic diagram showing a product side according to an embodiment of this application. As shown in FIG. 3, a cloud server 301A is connected to a gateway server 302A. The gateway server 302A divides client IP addresses into different UGs 303A according to different rules such as regions, operators, and access patterns, and sets an exclusive congestion control parameter for a session of a UG through RL based on the latest network state. When receiving a connection request from a client, the gateway server 302A may query UG identifiers corresponding to the client IP addresses for an (initialized) congestion control parameter matching the UG, and respond to the client request based on the congestion control parameter.

Figure 4:
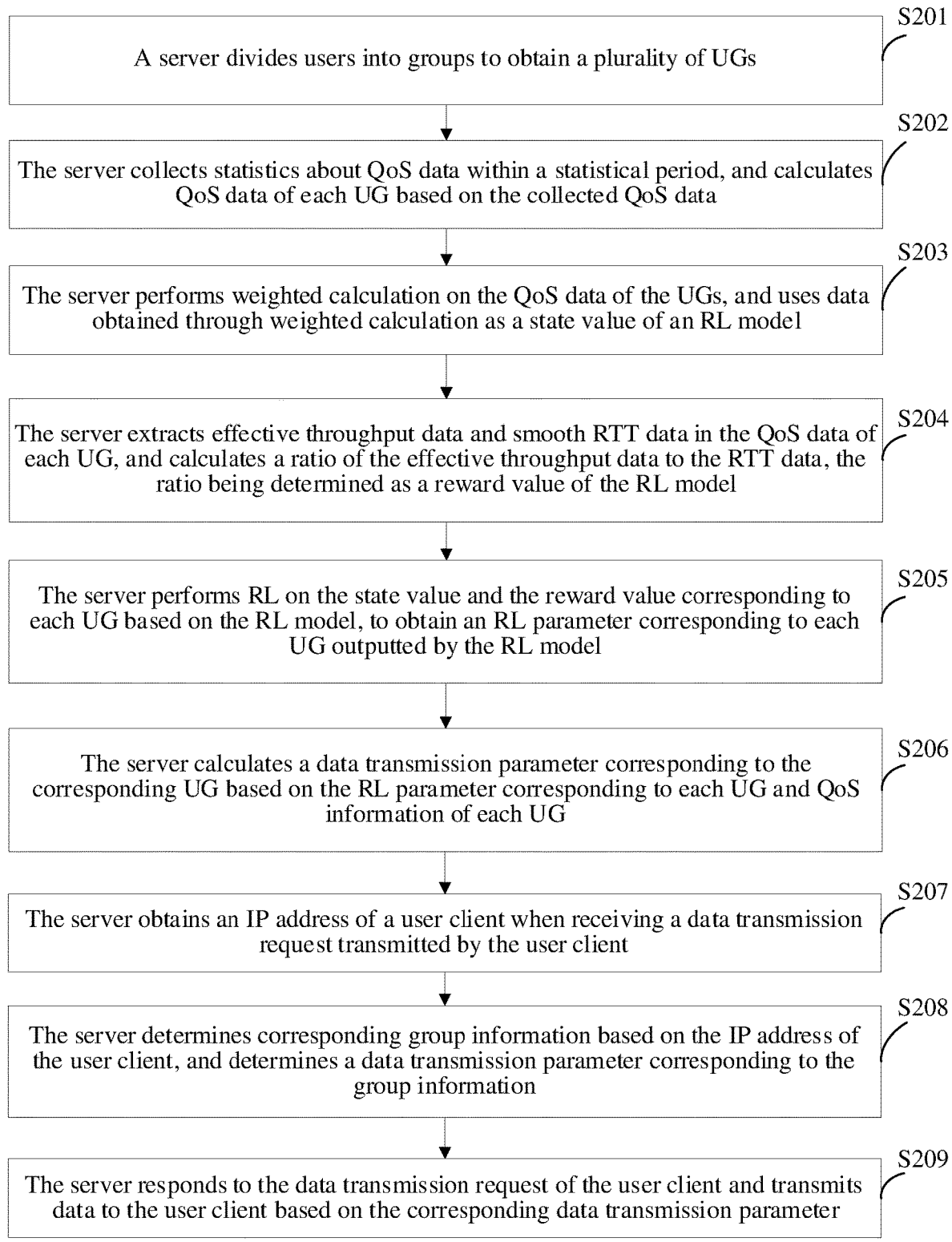
FIG. 4 is another schematic flowchart of a data transmission control method according to an embodiment of this application.

An embodiment of this application further provides a data transmission control method. The method may be used in a computer device, and the computer device may be a server. FIG. 4 is another schematic flowchart of a data transmission control method according to an embodiment of this application. The method includes the following process S201 to process S209:

Process S201: A server divides users into groups to obtain a plurality of UGs.

Herein, the server may divide IP addresses of clients corresponding to the users according to rules such as regions, operators, AS numbers, and access patterns, and divide client IP addresses into different UGs. Connections (or sessions) of each UG have similar network forwarding paths and also have similar network state information. The division of the UGs is not limited to division of the IP addresses of all clients, or may be division of some specific IP address prefixes or some IP address prefixes whose traffic proportion is greater than a traffic proportion threshold.

Figure 5A:
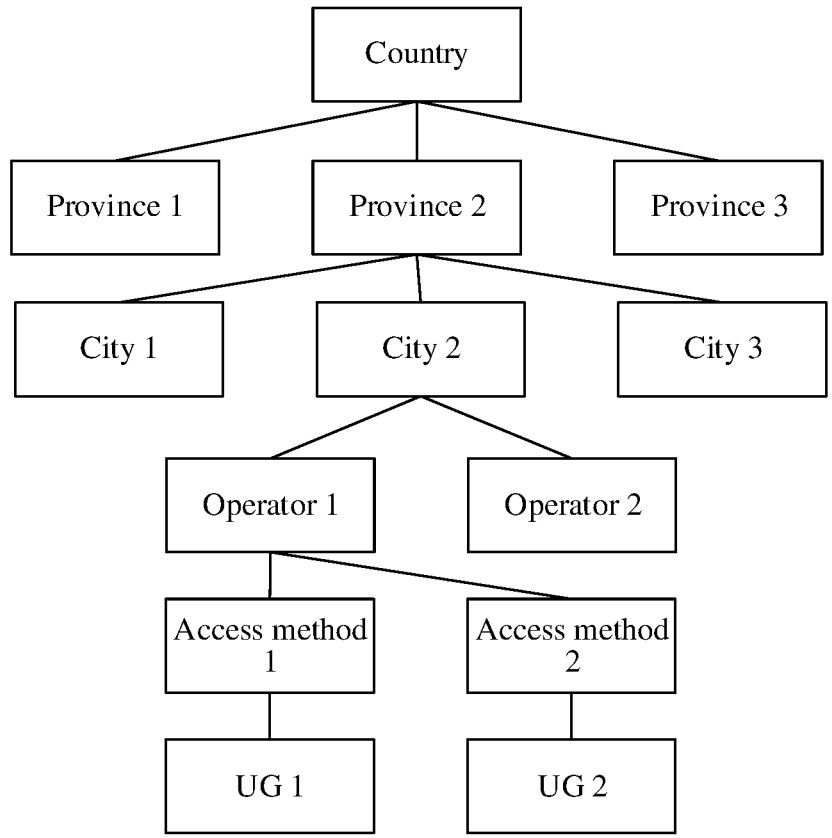
FIG. 5A is a schematic diagram showing division of Internet Protocol (IP) addresses according to all rules according to an embodiment of this application.
Figure 5B:
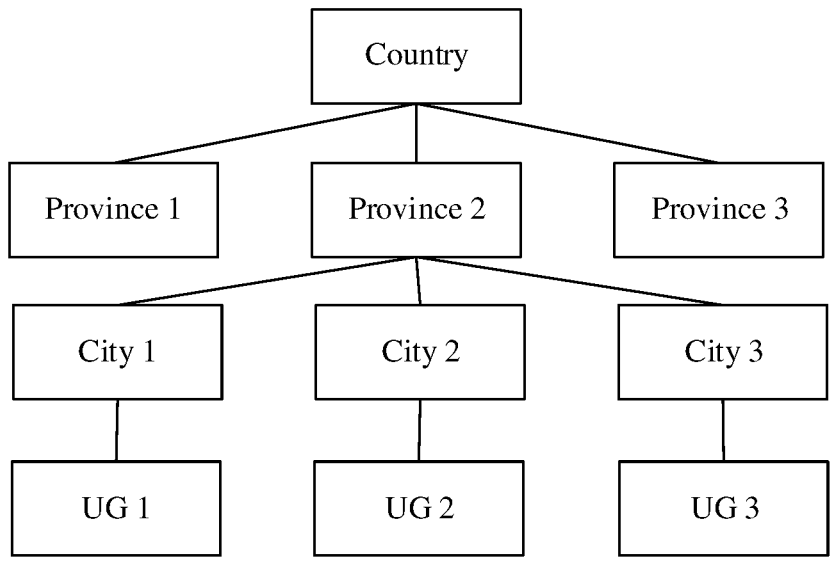
FIG. 5B is a schematic diagram showing division of IP addresses according to partial rules according to an embodiment of this application.

In some embodiments, the UGs may be divided according to all the rules (that is, regions, operators, AS numbers, and access patterns), or may be divided according to some rules such as region+operator, region+access pattern, and regions. FIG. 5A and FIG. 5B are schematic diagrams of a scheme for dividing IP addresses of a user client. FIG. 5A shows division according to all rules, and FIG. 5B shows division according to some rules (regions).

TABLE 1

| UG division information table | |
|---|---|
| IP address prefix | UG identifier |
| 192.168.0.0/24 | UG_1 |
| 192.168.1.0/24 | UG_1 |
| 192.168.2.0/24 | UG_1 |
| 192.168.3.0/24 | UG_2 |
| 192.168.4.0/24 | UG_2 |

Table 1 is a table of UG division information. UGs may be divided according to the IP address prefixes. The IP addresses belonging to the same UG have the same UG identifier.

Process S202: The server collects statistics about QoS data within a statistical period, and calculates QoS data of each UG based on the collected QoS data.

In this embodiment of this application, the server can record QoS information (that is, QoS data) and a client IP address of a network for each data stream. For example, when each stream ends, the server writes relevant QoS information and the client IP address for the stream to a log file of the server. The QoS information includes information such as a minimum RTT (min_rtt), a maximum RTT (max_rtt), a smooth RTT (srtt), a maximum quantity of inflight packets (max_inflight), a goodput, a retransmission ratio (retran_ratio), an initial window (init_cwnd), and a maximum window (max_cwnd). To be specific, the foregoing QoS information indicates QoS of the network. After each data stream is transmitted, the server records the IP address for the data stream and the information such as the minimum RTT (min_rtt), the maximum RTT (max_rtt), the smooth RTT (srtt), the maximum quantity of inflight packets (max_inflight), the goodput, the retransmission ratio (retran_ratio), the initial window (init_cwnd), and the maximum window (max_cwnd) for the data stream, so as to obtain the QoS information for the data stream.

The server may collect statistics about an average QoS and related quantiles (such as a 50% quantile or a 90% quantile of a QoS value) of each UG within a certain period of time (denoted as a statistical period T) every period T. For example, the server reads the QoS information and the client IP address for each stream one by one from the log file, and a correspondence between the IP address and the UG identifier is queried to obtain the UG identifier of each data stream. In addition, the QoS information of the data stream having the same UG identifier is averaged, or the relevant quantile (such as a 50% or 90% quantile) is obtained.

For example, a period of time T=15 min. The period of time includes 100 sessions of an IP address of 192.168.0.0/24, 200 sessions of an IP address of 192.168.1.0/24, 200 sessions of an IP address of 192.168.2.0/24, 50 sessions of an IP address of 192.168.3.0/24, and 50 sessions of an IP address of 192.168.4.0/24. Therefore, a quantity of sessions in a UG 1 (UG_1) is 500, and a quantity of sessions in a UG 2 (UG_2) is 100. In this embodiment of this application, it is assumed that the average QoS (QoS_avg_1) of 500 sessions in UG_1 is respectively a minimum average RTT (min_rtt_avg_1), a maximum average RTT (max_rtt_avg_1), an average smooth RTT (srtt_avg_1), an average goodput (goodput_avg_1), an average retransmission ratio (retran_ratio_avg_1), an average initial window (init_cwnd_avg_1), and a maximum average window (max_cwnd_avg_1), and an average QoS (QOS_avg_2) of 100 sessions in UG_2 is respectively a minimum average RTT (min_rtt_avg_2), a maximum average RTT (max_rtt_avg_2), an average smooth RTT (srtt_avg_2), an average goodput (goodput_avg_2), an average retransmission ratio (retran_ratio_avg_2), an average initial window (init_cwnd_avg_2), and a maximum average window (max_cwnd_avg_2). Therefore, a reward value of UG_1 is goodput_avg_1/srtt_avg_1, and a reward value of UG_2 is goodput_avg_2/srtt_avg_2.

Figure 6:
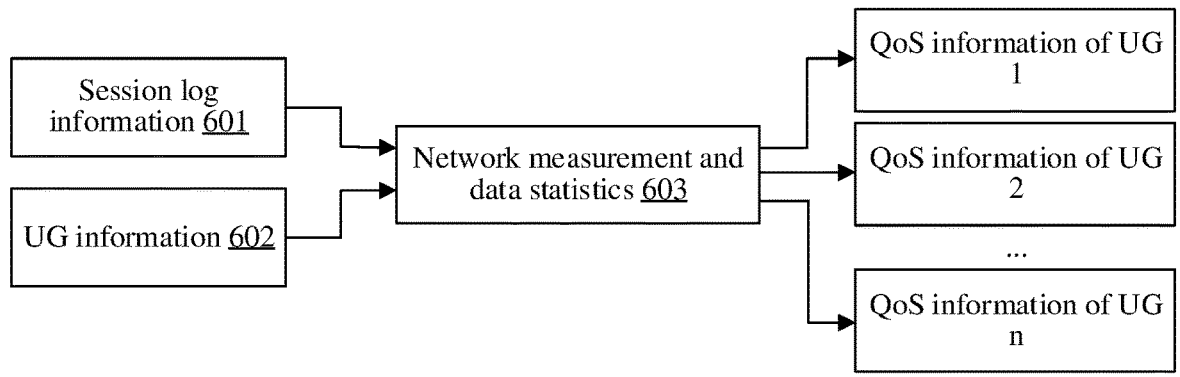
FIG. 6 is a schematic diagram showing an implementation process of quality of service (QOS) information measurement by a network measurement module according to an embodiment of this application.

In some embodiments, QoS information of each UG in the previous time period is measured and collected at intervals, which may be implemented by using a network measurement module in the server. FIG. 6 is a schematic flowchart of implementation of QoS information measurement performed by a network measurement module according to an embodiment of this application. As shown in FIG. 6, session log information 601 and UG information 602 are first obtained, and then network measurement and data statistics 603 are performed on the obtained session log information 601 and UG information 602, so as to obtain QoS information of different UGs, such as the QoS information of a UG 1, the QoS information of a UG 2, . . . , and the QoS information of a UG n shown in FIG. 6, n being an integer greater than 2.

Process S203: The server performs weighted calculation on the QoS data of the UGs, and uses data obtained through weighted calculation as a state value of an RL model.

Further, the server may obtain a weight coefficient of each UG. The weight coefficient may be manually set by a user, or may be calculated based on a quantity of users in the UG. After the weight coefficient of each UG is determined, weighted calculation may be performed on the QoS data of the UGs based on the weight coefficient of each UG, and the result of the weighted calculation is used as the state value of the RL model.

In some embodiments, weighted calculation may be performed on the QoS data of the UGs by using an intelligent learning module in the server. In some other embodiments, the intelligent learning module may not only be located in the server, but also be located on a gateway or on a remote dedicated server. The intelligent learning module includes an RL model. The RL model may implement initialization parameter control for traffic transmission of a plurality of UGs. To be specific, the RL model may set congestion control parameters for traffic of the plurality of UGs.

In this embodiment of this application, the server weighs the QoS information based on the UG, where QoS data of a UG i is denoted as QoS_i, and a weight of the QoS_i is denoted as w_i. In this case, the weighted QoS is shown in Formula (1):

$$QoS = w\_1*QoS\_1 + w\_2*QoS\_2 + \ldots + w\_n*QoS\_n. \tag{1}$$

Process S204: The server extracts goodput data and smooth RTT data in the QoS data of each UG, and calculates a ratio of the goodput data to the RTT data, the ratio being determined as a reward value of the RL model.

In this embodiment of this application, the server extracts the goodput data goodput and the smooth RTT data srtt in the QoS data of each UG, and calculates the ratio of the goodput data goodput to the RTT data srtt, the ratio being determined as the reward value of the RL model. The formula for calculating the reward value Reward of the RL model is Formula (2) as follows:

$$\text{Reward} = \text{goodput} / \text{srtt}. \tag{2}$$

In some embodiments, the goodput data (goodput) in Formula (2) may also be replaced with a throughput or a downloading speed (download_speed) of data from an application layer to a network layer. In some other embodiments, the goodput data (goodput) in Formula (2) may also be replaced with the average RTT, the minimum RTT, or the maximum RTT.

Process S205: The server performs RL on the state value and the reward value corresponding to each UG based on the RL model, to obtain an RL parameter corresponding to each UG outputted by the RL model.

After the state value and the reward value of the RL model are determined, the state value and the reward value described above may be inputted into the RL model for RL, and a parameter a outputted by the RL model may be obtained. Herein, the RL model may be one RL model or a plurality of RL models. Different UGs provide different reward values for the RL model. Therefore, the RL parameters learned by the RL model are also different for different UGs. For example, an output of the RL model may be one of parameter sets {−1, −0.5, 0, 0.5, 1} (which is denoted as α, the default value being 0).

Figure 7:
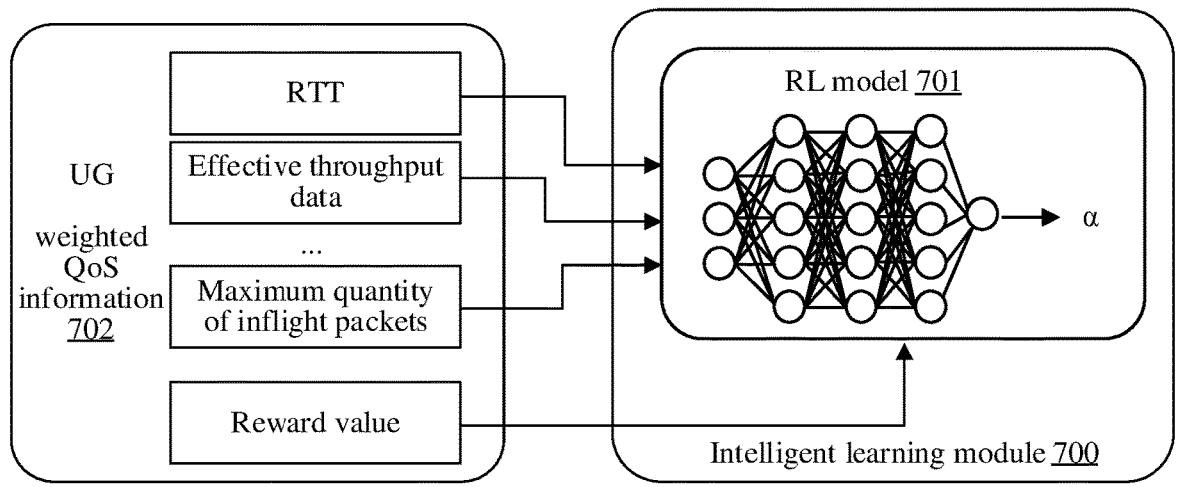
FIG. 7 is a schematic diagram showing a processing flow of an intelligent learning module according to an embodiment of this application.

FIG. 7 is a schematic diagram showing a processing flow of an intelligent learning module according to an embodiment of this application. As shown in FIG. 7, an input parameter of an RL model 701 inputted into an intelligent learning module 700 is UG weighted QoS data 702. The UG weighted QoS data 702 includes but is not limited to an RTT, goodput data (goodput), a maximum quantity of inflight packets (max_inflight), and a reward value. An output of the RL model 701 is a parameter a.

Process S206: The server calculates a data transmission parameter corresponding to a corresponding UG based on an RL parameter corresponding to each UG and QoS information of each UG.

Herein, after the RL parameter corresponding to each UG is learned, the data transmission parameter corresponding to the UG may be further calculated based on the RL parameter and the QoS information of each UG. The data transmission parameter herein may also be referred to as an initialized congestion control parameter. The data transmission parameter of each UG includes an initial transmission window init_cwnd and an initial RTT init_rtt. The initial transmission window init_cwnd and the initial RTT init_rtt may be calculated based on Formula (3) and Formula (4) as follows:

$$\text{init\_rtt} = \text{min\_rtt}; \tag{3}$$

$$\text{init\_cwnd} = 2\alpha*(\text{goodput}*\text{init\_rtt}). \tag{4}$$

For example, for the foregoing UG 1, that is, UG_1, an initialized congestion control parameter of the UG 1, that is, the initial transmission window init_cwnd_1 of the UG 1 and the initial RTT init_rtt_1 of the UG 1, are calculated by using the following Formula (5) and Formula (6):

$$\text{init\_rtt\_1} = \text{min\_rtt\_avg\_1}; \quad (5)$$

$$\text{init\_cwnd\_1} = 2\alpha*(\text{goodput\_avg\_1}*\text{init\_rtt\_1}) \quad (6)$$

where min_rtt_avg_1 represents a minimum average RTT of the UG 1, and goodput_avg_1 represents an average goodput of the UG 1.

For each UG, the data transmission parameter of the UG may be calculated by using the foregoing method. Then the data transmission parameter of each UG may be saved for use. Table 2 shows an example table of saved initialized parameters.

Table 2

| Table of initialized parameters | | |
| --- | --- | --- |
| UG ID | Init_rtt | Init_cwnd |
| UG_1 | Init_rtt_1 | Init_cwnd_1 |
| UG_2 | Init_rtt_2 | Init_cwnd_2 |

Figure 8:
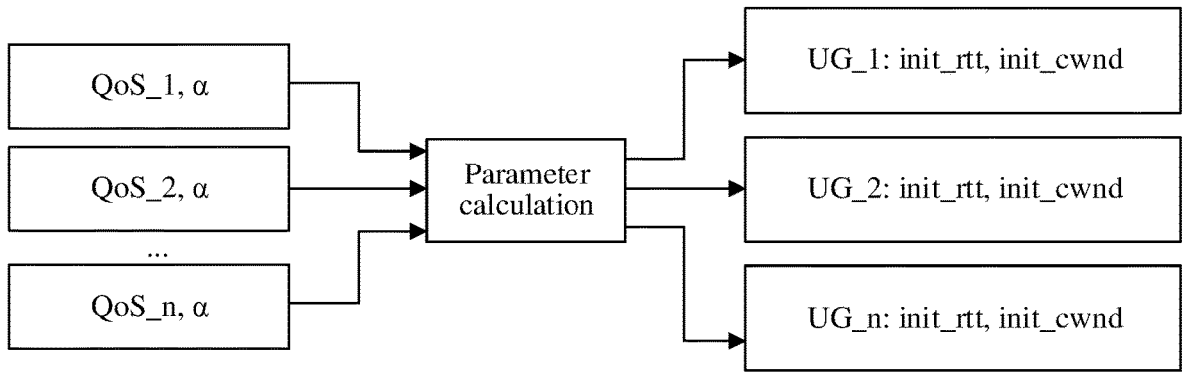
FIG. 8 is a schematic diagram showing a processing process of an adaptive control module according to an embodiment of this application.

In this embodiment of this application, the calculation process of the foregoing data transmission parameter may be implemented by using an adaptive control module. FIG. 8 is a schematic diagram showing a processing process of an adaptive control module according to an embodiment of this application. As shown in FIG. 8, the adaptive control module calculates an initial congestion parameter value applicable to a UG (UG_i) for each UG through parameter calculation based on QoS information (QOS_i) and a parameter a of the UG i. In this embodiment of this application, the initial congestion parameters of all UGs jointly form an initial parameter list, such as init_rtt and init_cwnd corresponding to UG_1, UG_2, . . . , and UG_n in the finally obtained data transmission parameters in FIG. 8.

Process S207: The server obtains an IP address of a user client when receiving a data transmission request transmitted by the user client.

The server may obtain the IP address included in the data transmission request when receiving the data transmission request transmitted by the user client.

Process S208: The server determines corresponding group information based on the IP address of the user client, and determines a data transmission parameter corresponding to the group information.

After the IP address of the user client is obtained, the group information corresponding to the user client may be further determined, and the table of initialized parameters may be further searched for an initialized parameter corresponding to the group based on the group information. To be specific, the corresponding data transmission parameter is found.

Process S209: The server responds to the data transmission request of the user client and transmits data to the user client based on the corresponding data transmission parameter.

In this embodiment of this application, when the server receives the data transmission request from the user client (for example, the request may be a session request), a UG identifier (UG_i) is queried based on the IP address of the user client, and then the initial parameter list is queried based on the obtained UG_i to obtain the initial congestion parameters init_rtt and init_cwnd corresponding to UG_i. Finally, the server responds to the data transmission request of the user client with init_rtt and init_cwnd, and transmits the data.

After the data transmission parameter of the UG corresponding to the user client is determined, the data transmission request of the user client may be responded based on the parameter, and request data is transmitted to the user client. For example, when it is determined based on a user ID that a UG to which a user belongs is UG_2, it may be determined that the initial RTT is Init_rtt_2 and the initial cwnd is Init_cwnd_2 in the initial data transmission parameters of the UG. In this way, the RTT in the initial network parameter during the transmission of the data to the user client may be set to Init_rtt_2, cwnd in the initial network parameter is set to Init_cwnd_2, and then the corresponding data transmission is performed.

Congestion control algorithms in the related art may be divided into two types. The first type is a "rule-based" congestion control algorithm based on expert experience. This algorithm determines, based on packet loss information, delay information, or bandwidth detection information, whether a congestion phenomenon occurs in a current network, so as to perform an action such as congestion avoidance. However, these methods often rely on the experience of network personnel to set a manner of congestion avoidance, and lack strong adaptability to the network state and related services (such as audio and video services), resulting in less benefit from network transmission performance optimization. The other type of congestion control algorithm is mainly based on artificial intelligence. This algorithm either completely overturns the existing congestion control algorithm, or has many problems in aspects such as stability and fine control, and cannot be effectively deployed. However, through the UG-oriented adaptive congestion control method (that is, the foregoing data transmission control method) provided in the embodiments of this application, the foregoing problems can be better resolved. Advantages of the conventional congestion control are retained by using the network measurement technology. A new congestion control parameter is set based on the conventional congestion control algorithm, which avoids a convergence challenge faced by a machine learning-based congestion control algorithm in the related art, and can ensure stability of the proposed adaptive congestion control method to some extent. Meanwhile, in the embodiments of this application, client IP addresses are divided into different UGs according to rules such as regions, operators, and access patterns, and a specific initialized congestion control parameter is set for each UG by using a single RL module based on RL, thereby implementing refined and lightweight control of congestion avoidance during network traffic transmission. The adaptive congestion control method proposed in the embodiments of this application can achieve greater benefits in terms of setting of the initialized parameter by using the existing congestion control algorithm, which is beneficial to improving network transmission performance of video and audio traffic and enhancing competitiveness of the audio and video services.

Figure 9:
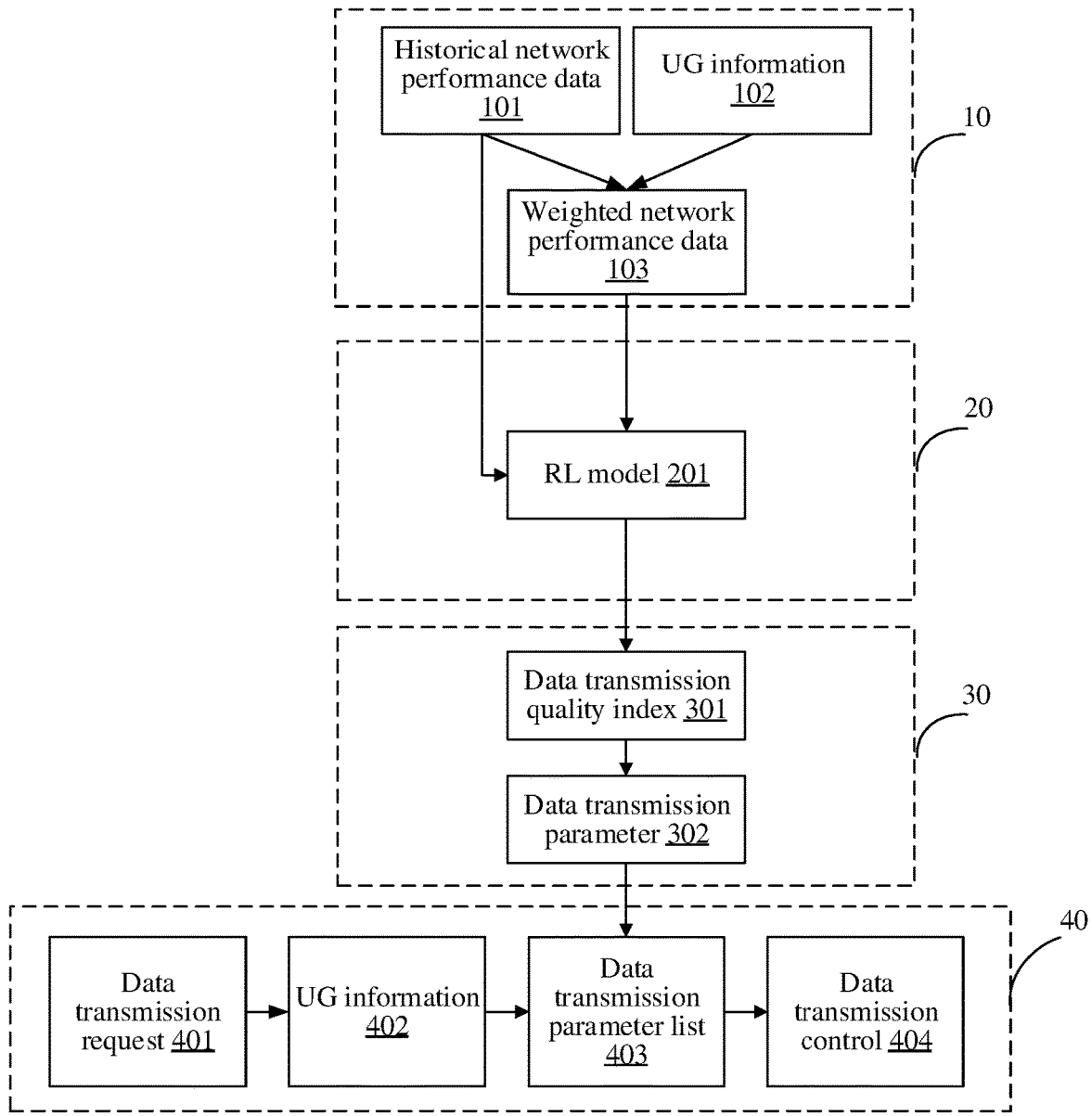
FIG. 9 is still another schematic flowchart of a data transmission control method according to an embodiment of this application.

FIG. 9 is still another schematic flowchart of a data transmission control method according to an embodiment of this application. As shown in FIG. 9, the process may be performed by the following four modules: a network measurement module 10, an intelligent learning module 20, a parameter calculation module 30, and a transmission control module 40. The network measurement module 10 may obtain historical network performance data 101 of a plurality of users, and divide the users into a plurality of UGs based on IP addresses to obtain UG information 102 of each user, and determines group network performance data corresponding to each UG based on the historical network performance data 101 of each user. Further, the network measurement module 10 may also perform weighted calculation on the group network performance data of the plurality of UGs, to obtain weighted network performance data 103. The intelligent learning module 20 may use the weighted network performance data as a state value, and a ratio of a goodput to a smooth RTT in the group network performance data as a reward value, and perform RL through an RL model, to obtain a learned data transmission quality index. The parameter calculation module 30 may calculate a data transmission parameter 302 corresponding to each UG by using a data transmission quality index 301 learned by an RL model 201, so as to form a data transmission parameter list 403. The transmission control module 40 may determine, based on the IP address of the user when receiving the data transmission request 401 uploaded by the user, the UG to which the user belongs, to obtain UG information 402, then query the data transmission parameter list 403 for the data transmission parameter corresponding to the UG, and use the corresponding data transmission parameter to perform data transmission control 404 on a data transmission process, thereby improving transmission performance of data transmission.

It may be learned from the foregoing description that according to the data transmission control method provided in the embodiments of this application, historical network performance data of a plurality of data transmission objects is obtained, and group network performance data of each object group (that is, the foregoing UG) is calculated based on the historical network performance data, the object group being a group obtained by dividing the plurality of data transmission objects. Weighted calculation is performed on the group network performance data to obtain comprehensive network performance data. A trained RL model is invoked for prediction based on the comprehensive network performance data and the group network performance data of each object group, to obtain a data transmission quality index of each object group. A data transmission parameter of each object group is calculated based on the data transmission quality index and the group network performance data. In a case that the data transmission request transmitted by the target data transmission object is received, a target data transmission parameter is determined based on an object group to which the target data transmission object belongs, and a data transmission process is controlled based on the target data transmission parameter.

Therefore, according to the data transmission control method provided in the embodiments of this application, the data transmission objects are divided into groups, and then the historical network performance data of each object group in a recent period is used to perform RL, to obtain the most suitable network data transmission parameter for each object group at a current time. According to the method, fine-grained control may be performed on the network data transmission parameter, so as to match the most suitable network data transmission parameter for each data transmission object at the current time, which may greatly improve the data transmission performance of the data transmission object.

To better implement the foregoing data transmission control method, an embodiment of this application further provides a data transmission control apparatus. The data transmission control apparatus may be integrated in a terminal or a server.

Figure 10:
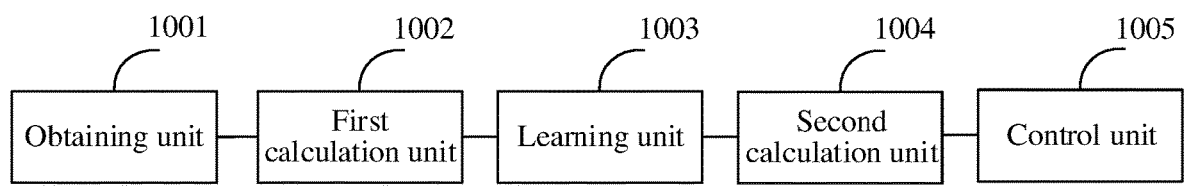
FIG. 10 is a schematic structural diagram of a data transmission control apparatus according to an embodiment of this application.

FIG. 10 is a schematic structural diagram of a data transmission control apparatus according to an embodiment of this application. The data transmission control apparatus may include an obtaining unit 1001, a first calculation unit 1002, a learning unit 1003, a second calculation unit 1004, and a control unit 1005. The obtaining unit 1001 is configured to obtain historical network performance data of each of a plurality of data transmission objects, and calculate group network performance data of each of a plurality of object groups based on the historical network performance data, the plurality of object groups being obtained by dividing the plurality of data transmission objects. The first calculation unit 1002 is configured to perform weighted calculation on the group network performance data of the object groups, to obtain comprehensive network performance data of the plurality of data transmission objects. The learning unit 1003 is configured to input the comprehensive network performance data and the group network performance data of each object group into a trained RL model, to obtain a data transmission quality index of each object group. The second calculation unit 1004 is configured to determine a data transmission parameter of the corresponding object group based on the data transmission quality index and the group network performance data of each object group. The control unit 1005 is configured to determine, in a case that a data transmission request transmitted by any target data transmission object among the plurality of data transmission objects is received, a target data transmission parameter based on an object group to which the target data transmission object belongs, and control a data transmission process corresponding to the data transmission request based on the target data transmission parameter.

In some embodiments, the learning unit is further configured to: calculate an RL parameter of the corresponding object group based on the group network performance data of each object group; determine the comprehensive network performance data as a state value of the RL model, and determine the RL parameter as a reward value of the RL model; and input the state value and the reward value into the trained RL model, and output the data transmission quality index of each object group by using the trained RL model.

In some embodiments, the first calculation unit is further configured to: obtain the group network performance data of each object group; extract goodput data and smooth RTT data from the group network performance data of each object group; calculate a ratio of the goodput data to the smooth RTT data corresponding to each object group; and determine the ratio as the RL parameter of the corresponding object group.

In some embodiments, the obtaining unit is further configured to: obtain IP address data of each of the plurality of data transmission objects, and obtain the historical network performance data of each data transmission object; divide the plurality of data transmission objects into the plurality of object groups based on the IP address data of each data transmission object; and calculate the group network performance data of the corresponding object group based on the historical network performance data of the data transmission object in each object group.

In some embodiments, the second calculation unit is further configured to: determine a historical network performance data set corresponding to the corresponding object group based on the historical network performance data of each data transmission object in each object group; calculate an average of the historical network performance data in each historical network performance data set; and determine the average corresponding to each historical network performance data set as the group network performance data of the corresponding object group.

In some embodiments, the first calculation unit is further configured to: obtain a weight coefficient of each object group; and perform weighted calculation on the group network performance data of each object group based on the weight coefficient, to obtain the comprehensive network performance data corresponding to the plurality of data transmission objects.

In some embodiments, the first calculation unit is further configured to: obtain a quantity of data transmission objects included in each object group; and determine a ratio of the quantity of data transmission objects in each object group to a quantity of the plurality of data transmission objects as the weight coefficient of the corresponding object group.

In some embodiments, the second calculation unit is further configured to: extract the goodput data and minimum RTT data of each object group from the group network performance data of each object group; calculate initial window data of the corresponding object group based on the goodput data, the minimum RTT data, and the data transmission quality index of each object group; and determine the data transmission parameter of the corresponding object group based on the initial window data of each object group.

In some embodiments, the control unit is further configured to: obtain a target IP address of the target data transmission object in a case that the data transmission request transmitted by any target data transmission object among the plurality of data transmission objects is received; determine, based on the target IP address, a target object group to which the target data transmission object belongs; obtain the target data transmission parameter of the target object group; and perform data transmission on the target data transmission object based on the target data transmission parameter.

The foregoing units may be implemented as independent entities, or may be combined arbitrarily, or may be implemented as the same entity or several entities. For specific implementation of the foregoing units, reference may be made to the foregoing method embodiments, and details are not described herein again.

It may be learned from the foregoing description that in the data transmission control apparatus provided in the embodiments of this application, the historical network performance data of each of the plurality of data transmission objects is obtained by using the obtaining unit 1001, and the group network performance data of each of the plurality of object groups is calculated based on the historical network performance data. The first calculation unit 1002 is configured to perform weighted calculation on the group network performance data, to obtain the comprehensive network performance data of the plurality of data transmission objects. The learning unit 1003 is configured to input the comprehensive network performance data and the group network performance data of each object group into a trained RL model, to obtain the data transmission quality index of each object group. The second calculation unit 1004 is configured to determine the data transmission parameter of the corresponding object group based on the data transmission quality index and the group network performance data of each object group. In a case that a data transmission request transmitted by any target data transmission object among the plurality of data transmission objects is received, the control unit 1005 is configured to determine a target data transmission parameter based on an object group to which the target data transmission object belongs, and control the data transmission process based on the target data transmission parameter.

Therefore, according to the data transmission control method provided in the embodiments of this application, the data transmission objects are divided into groups, and then the historical network performance data of each object group in a recent period is used to perform RL, to obtain the most suitable network data transmission parameter for each object group at a current time. According to the data transmission control method, fine-grained control may be performed on the network data transmission parameter, so as to match the most suitable network data transmission parameter for each data transmission object at the current time, which may greatly improve the data transmission performance of the data transmission object.

Figure 11:
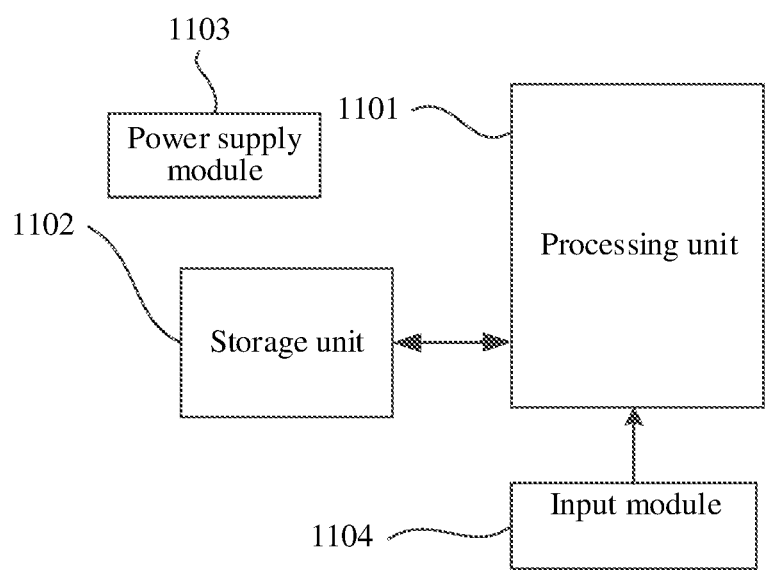
FIG. 11 is a schematic structural diagram of a computer device according to an embodiment of this application.

An embodiment of this application further provides a computer device. The computer device may be a terminal or a server. FIG. 11 is a schematic structural diagram of a computer device according to an embodiment of this application. The computer device may include components such as a processing unit 1101 with one or more processing cores, a storage unit 1102 with one or more storage media, a power supply module 1103, and an input module 1104. A person skilled in the art may understand that a structure of the computer device shown in FIG. 11 does not constitute a limitation on the computer device, and may include more or fewer components than those shown in the figure, or some components may be combined, or different component deployment may be used. The processing unit 1101 is a control center of the computer device, which connects various parts of the entire computer device by using various interfaces and lines, and executes various functions of the computer device and performs data processing by running or executing at least one of a software program and/or modules stored in the storage unit 1102 and calling data stored in the storage unit 1102. In some embodiments, the processing unit 1101 may include one or more processing cores. The processing unit 1101 may integrate an application processor and a modem. The application processor mainly processes an operating system, an object interface, an application program, and the like. The modem mainly processes wireless communication. It may be understood that the foregoing modem may not be integrated into the processing unit 1101.

The storage unit 1102 may be configured to store a software program and a module, and the processing unit 1101 executes various function applications and performs data processing by running the software program and the module stored in the storage unit 1102. The storage unit 1102 may mainly include a program storage area and a data storage area. The program storage area may store an operating system, an application program required by at least one function (for example, a sound playback function, an image playback function, and web page access), and the like. The data storage area may store data created based on use of the computer device, and the like. In addition, the storage unit 1102 may include a high speed random access memory, and may further include a non-volatile memory, such as at least one magnetic disk storage device, a flash memory device, or another non-volatile solid state storage device. The storage unit 1102 may further include a memory controller to provide access to the storage unit 1102 by the processing unit 1101.

The computer device further includes a power supply module 1103 that supplies power to each component. The power supply module 1103 may be logically connected to the processing unit 1101 by using a power management system, thereby implementing functions such as management of charging and discharging and power management through the power management system. The power supply module 1103 may further include any component such as one or more direct current or alternating current power supplies, a recharging system, a power failure detection circuit, a power converter or inverter, and a power state indicator.

In some embodiments, the computer device may further include an input module 1104. The input module 1104 may be configured to receive inputted numeric or character information, and generate inputs of a keyboard, a mouse, a joystick, an optical or trackball signal that are related to object settings and function control.

Although not shown in the figure, the computer device may further include a display unit, and the like. Details are not described herein again. In this embodiment, the processing unit 1101 in the computer device may load executable instructions corresponding to processes of one or more application programs into the storage unit 1102 based on the following instructions. The processing unit 1101 runs the application programs stored in the storage unit 1102, to implement various functions, for example, implement the following functions: obtaining historical network performance data of each of a plurality of data transmission objects, and calculating group network performance data of each of a plurality of object groups based on the historical network performance data; performing weighted calculation on the group network performance data of the object groups, to obtain comprehensive network performance data; inputting the comprehensive network performance data and the group network performance data of each object group into a trained RL model, to obtain a data transmission quality index of each object group; determining a data transmission parameter of the corresponding object group based on the data transmission quality index and the group network performance data of each object group; and determining, in a case that a data transmission request transmitted by any target data transmission object among the plurality of data transmission objects is received, a target data transmission parameter based on an object group to which the target data transmission object belongs, and controlling a data transmission process based on the target data transmission parameter.

The computer device provided in the embodiments of this application belongs to the same concept as the method in the foregoing embodiment. For specific implementation of the foregoing operations, reference may be made to the foregoing embodiments, and details are not described herein again.

A person of ordinary skill in the art may understand that, all or some of the steps of the various methods in the foregoing embodiments may be performed by using an instruction, or performed by using the instruction to control relevant hardware. The instruction may be stored in a computer-readable storage medium, and loaded and executed by a processor.

Accordingly, an embodiment of this application provides a computer-readable storage medium, having a plurality of executable instructions stored therein. The executable instructions can be loaded by a processor to perform the steps in any one of the methods provided in the embodiments of this application. For example, the executable instructions may perform the following steps: obtaining historical network performance data of each of a plurality of data transmission objects, and calculating group network performance data of each of a plurality of object groups based on the historical network performance data; performing weighted calculation on the group network performance data of the object groups, to obtain comprehensive network performance data; inputting the comprehensive network performance data and the group network performance data of each object group into a trained RL model, to obtain a data transmission quality index of each object group; determining a data transmission parameter of the corresponding object group based on the data transmission quality index and the group network performance data of each object group; and determining, in a case that a data transmission request transmitted by any target data transmission object among the plurality of data transmission objects is received, a target data transmission parameter based on an object group to which the target data transmission object belongs, and controlling a data transmission process based on the target data transmission parameter.

For specific implementation of the foregoing operations, reference may be made to the foregoing embodiments, and details are not described herein again.

The computer-readable storage medium may include a read-only memory (ROM), a random access memory (RAM), a magnetic disk, an optical disc, or the like.

Since the executable instructions stored in the computer-readable storage medium may perform the steps in any one of the methods in the embodiments of this application, the executable instructions may also implement beneficial effects that can be implemented by using any one of the methods provided in the embodiments of this application. For details, reference is made to the foregoing embodiments, and the details are not described herein again.

According to an aspect of the embodiments of this application, a computer program product or a computer program is provided, including an executable instruction, the executable instruction being stored in a computer-readable storage medium. A processor of a computer device reads the executable instruction from the computer-readable storage medium. The processor executes the executable instruction, so that the computer device performs the methods provided in various alternative implementations of the foregoing data transmission control method.

The data transmission control method and apparatus, the computer-readable storage medium, the computer device, and the computer program product provided in the embodiments of this application are described in detail above. The principles and the implementations of this application are described by using specific examples in this specification. The descriptions of the foregoing embodiments are merely intended to help understand the method of this application and the core idea thereof. In addition, a person skilled in the art may make modifications to the specific implementations and application scope according to the idea of this application. In conclusion, the content of this specification is not to be construed as a limitation on this application.

What is claimed is:

1. A data transmission control method, performed by a computer device, comprising:
    obtaining Internet protocol (IP) address data and historical network performance data of each of a plurality of data transmission objects;
    dividing, based on the IP address data of each data transmission object, the plurality of data transmission objects into a plurality of object groups each including one or more data transmission objects of the plurality of data transmission objects;
    for each object group, calculating group network performance data of the object group based on the historical network performance data of the one or more data transmission objects in the object group;

performing weighted calculation on the group network performance data of the object groups, to obtain comprehensive network performance data of the plurality of data transmission objects;

inputting the comprehensive network performance data and the group network performance data of each object group into a trained reinforcement learning (RL) model, to obtain a data transmission quality index of each object group;

for each object group of the plurality of object groups, determining a data transmission parameter of the object group based on the data transmission quality index and the group network performance data of the object group; and determining, in response to receiving a data transmission request transmitted by a target data transmission object among the plurality of data transmission objects, a target data transmission parameter based on a target object group to which the target data transmission object belongs, and controlling a data transmission process corresponding to the data transmission request based on the target data transmission parameter.

2. The method according to claim 1, wherein inputting the comprehensive network performance data and the group network performance data of each object group into the trained RL model, to obtain the data transmission quality index of each object group includes:

for each object group, calculating an RL parameter of the object group based on the group network performance data of the object group; and inputting, into the RL model, the comprehensive network performance data as a state value of the RL model and the RL parameter of each object group as a reward value of the RL model, for the RL model to output the data transmission quality index of each object group.

3. The method according to claim 2, wherein for each object group, calculating the RL parameter of the object group based on the group network performance data of the object group includes:

obtaining the group network performance data of the object group;

extracting effective throughput data and smooth round-trip time (RTT) data from the group network performance data of the object group; and calculating a ratio of the effective throughput data to the smooth RTT data as the RL parameter of the object group.

4. The method according to claim 1, wherein for each object group, calculating the group network performance data of the object group based on the historical network performance data of the one or more data transmission objects in the object group includes:

calculating an average of the historical network performance data of the one or more data transmission objects in object group; and determining the average as the group network performance data of the object group.

5. The method according to claim 1, wherein performing weighted calculation on the group network performance data of the object groups, to obtain the comprehensive network performance data includes:

for each object group, obtaining a weight coefficient of the object group; and performing weighted calculation on the group network performance data of the object groups based on the weight coefficients of the object groups, to obtain the comprehensive network performance data.

6. The method according to claim 5, wherein for each object group, obtaining the weight coefficient of the object group includes:

obtaining a quantity of data transmission objects in the object group; and calculating a ratio of the quantity of data transmission objects in the object group to a quantity of the plurality of data transmission objects as the weight coefficient of the object group.

7. The method according to claim 1, wherein for each object group, determining the data transmission parameter based on the data transmission quality index and the group network performance data of the object group includes:

extracting effective throughput data and minimum round-trip time (RTT) data of the object group from the group network performance data of the object group;

calculating initial window data of the object group based on the effective throughput data, the minimum RTT data, and the data transmission quality index of the object group; and determining the data transmission parameter of the object group based on the initial window data of the object group.

8. The method according to claim 1, wherein determining the target data transmission parameter based on the target object group, and controlling the data transmission process corresponding to the data transmission request based on the target data transmission parameter includes:

obtaining a target Internet protocol (IP) address of the target data transmission object;

determining, based on the target IP address, the target object group;

obtaining the target data transmission parameter of the target object group; and performing data transmission on the target data transmission object based on the target data transmission parameter.

9. A computer device comprising:

one or more processors; and one or more memories storing one or more instructions that, when executed by the one or more processors, cause the one or more processors to:

obtain Internet protocol (IP) address data and historical network performance data of each of a plurality of data transmission objects;

divide, based on the IP address data of each data transmission object, the plurality of data transmission objects into a plurality of object groups each including one or more data transmission objects of the plurality of data transmission objects;

for each object group, calculate group network performance data of the object group based on the historical network performance data of the one or more data transmission objects in the object group;

perform weighted calculation on the group network performance data of the object groups, to obtain comprehensive network performance data of the plurality of data transmission objects;

input the comprehensive network performance data and the group network performance data of each object group into a trained reinforcement learning (RL) model, to obtain a data transmission quality index of each object group;

for each object group of the plurality of object groups, determine a data transmission parameter of the object group based on the data transmission quality index and the group network performance data of the object group; and determine, in response to receiving a data transmission request transmitted by a target data transmission object among the plurality of data transmission objects, a target data transmission parameter based on a target object group to which the target data transmission object belongs, and control a data transmission process corresponding to the data transmission request based on the target data transmission parameter.

10. The computer device according to claim 9, wherein the one or more instructions further cause the one or more processors to:

for each object group, calculate an RL parameter of the object group based on the group network performance data of the object group; and input, into the RL model, the comprehensive network performance data as a state value of the RL model and the RL parameter of each object group as a reward value of the RL model, for the RL model to output the data transmission quality index of each object group.

11. The computer device according to claim 10, wherein the one or more instructions further cause the one or more processors to:

obtain the group network performance data of the object group;

extract effective throughput data and smooth round-trip time (RTT) data from the group network performance data of the object group; and calculate a ratio of the effective throughput data to the smooth RTT data as the RL parameter of the object group.

12. The computer device according to claim 9, wherein the one or more instructions further cause the one or more processors to:

calculate an average of the historical network performance data of the one or more data transmission objects in object group; and determine the average as the group network performance data of the object group.

13. The computer device according to claim 9, wherein the one or more instructions further cause the one or more processors to:

for each object group, obtain a weight coefficient of the object group; and perform weighted calculation on the group network performance data of the object groups based on the weight coefficients of the object groups, to obtain the comprehensive network performance data.

14. The computer device according to claim 13, wherein the one or more instructions further cause the one or more processors to:

obtain a quantity of data transmission objects in the object group; and calculate a ratio of the quantity of data transmission objects in the object group to a quantity of the plurality of data transmission objects as the weight coefficient of the object group.

15. The computer device according to claim 9, wherein the one or more instructions further cause the one or more processors to:

extract effective throughput data and minimum round-trip time (RTT) data of the object group from the group network performance data of the object group;

calculate initial window data of the object group based on the effective throughput data, the minimum RTT data, and the data transmission quality index of the object group; and determine the data transmission parameter of the object group based on the initial window data of the object group.

16. The computer device according to claim 9, wherein the one or more instructions further cause the one or more processors to:

obtain a target Internet protocol (IP) address of the target data transmission object;

determine, based on the target IP address, the target object group;

obtain the target data transmission parameter of the target object group; and perform data transmission on the target data transmission object based on the target data transmission parameter.

17. A non-transitory computer-readable storage medium storing one or more instructions that, when executed by one or more processors, cause the one or more processors to:

obtain Internet protocol (IP) address data and historical network performance data of each of a plurality of data transmission objects;

divide, based on the IP address data of each data transmission object, the plurality of data transmission objects into a plurality of object groups each including one or more data transmission objects of the plurality of data transmission objects;

for each object group, calculate group network performance data of the object group based on the historical network performance data of the one or more data transmission objects in the object group;

perform weighted calculation on the group network performance data of the object groups, to obtain comprehensive network performance data of the plurality of data transmission objects;

input the comprehensive network performance data and the group network performance data of each object group into a trained reinforcement learning (RL) model, to obtain a data transmission quality index of each object group;

for each object group of the plurality of object groups, determine a data transmission parameter of the object group based on the data transmission quality index and the group network performance data of the object group; and determine, in response to receiving a data transmission request transmitted by a target data transmission object among the plurality of data transmission objects, a target data transmission parameter based on a target object group to which the target data transmission object belongs, and control a data transmission process corresponding to the data transmission request based on the target data transmission parameter.

18. The storage medium according to claim 17, wherein the one or more instructions further cause the one or more processors to:

for each object group, calculate an RL parameter of the object group based on the group network performance data of the object group; and input, into the RL model, the comprehensive network performance data as a state value of the RL model and the RL parameter of each object group as a reward value of the RL model, for the RL model to output the data transmission quality index of each object group.

* * * * *